United States Patent [19]
Onishi et al.

[11] Patent Number: 5,859,421
[45] Date of Patent: Jan. 12, 1999

[54] CONTACT-TYPE IMAGE SENSOR

[75] Inventors: Hiroaki Onishi; Toshio Amano, both of Kyoto, Japan

[73] Assignee: Rohm Co., Ltd., Kyoto, Japan

[21] Appl. No.: 853,812

[22] Filed: May 9, 1997

[30] Foreign Application Priority Data

May 10, 1996 [JP] Japan ................................. 8-116134

[51] Int. Cl.[6] .............................. H01J 40/14; H01J 3/14
[52] U.S. Cl. ...................... 250/208.1; 358/471; 358/484
[58] Field of Search ............................... 250/208.1, 216; 358/471, 474, 484, 494–497

[56] References Cited

U.S. PATENT DOCUMENTS

| | | | |
|---|---|---|---|
| 4,783,700 | 11/1988 | Negane | 358/482 |
| 5,038,027 | 8/1991 | Ioka | 250/208.1 |
| 5,130,847 | 7/1992 | Tsujioka | 358/473 |
| 5,182,455 | 1/1993 | Yamashita | 250/208.1 |
| 5,399,850 | 3/1995 | Nagatani et al. | 250/216 |

*Primary Examiner*—Stephone B. Allen
*Attorney, Agent, or Firm*—Majestic, Parsons, Siebert & Hsue P.C.

[57] ABSTRACT

An image sensor has a case, a glass cover attached to its upper surface, a head plate carrying a plurality of image sensor chips, a plurality of light-emitting elements for illuminating a document placed on the glass cover and a rod lens array for focusing the reflected light from the document on the image sensor chips, and a light-conducting member which is placed inside the case for effectively directing the light from the light-emitting elements to a specified area of the glass cover. The upper surface of the rod lens array at both its ends is compressed by compressing members formed at both end parts of the light-conducting member. The rod lens array is inserted from above into a holder having a groove formed inside the case. The holder may have protrusions formed for engaging with an edge on the upper surface of the rod lens array approximately in the middle in the longitudinal direction for easy attachment.

24 Claims, 5 Drawing Sheets

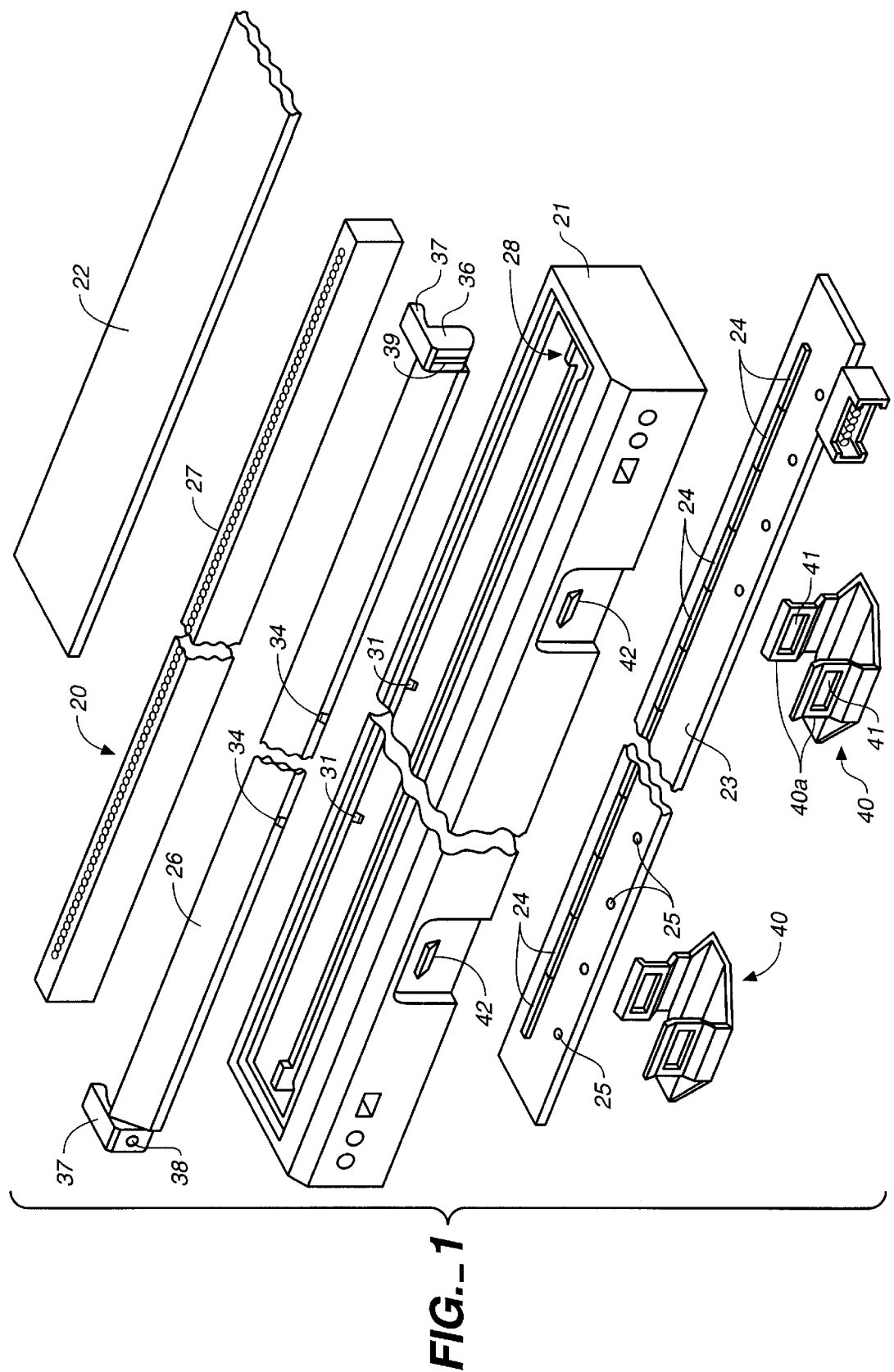
FIG._1

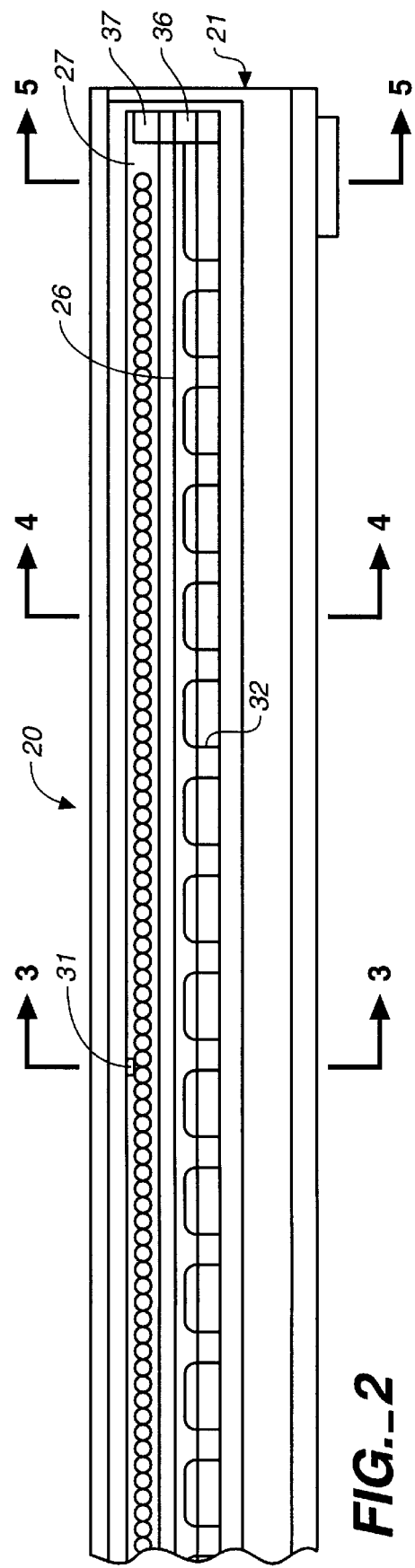
FIG._2

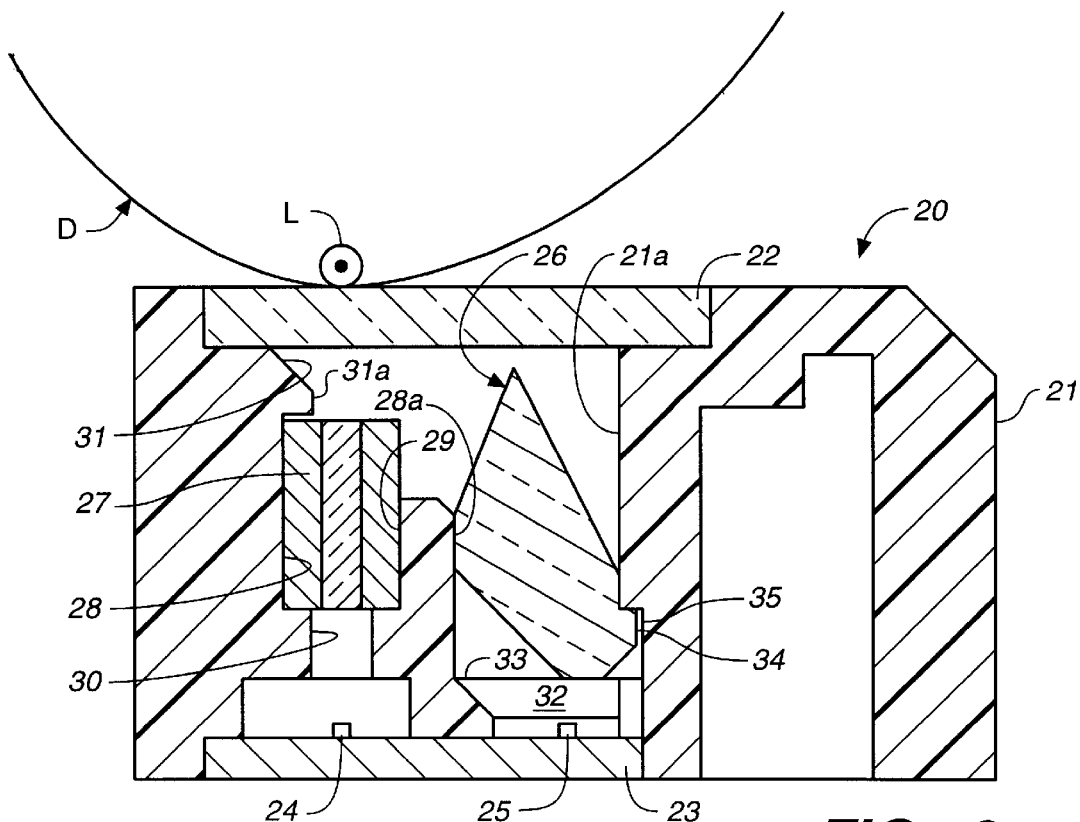
FIG._3
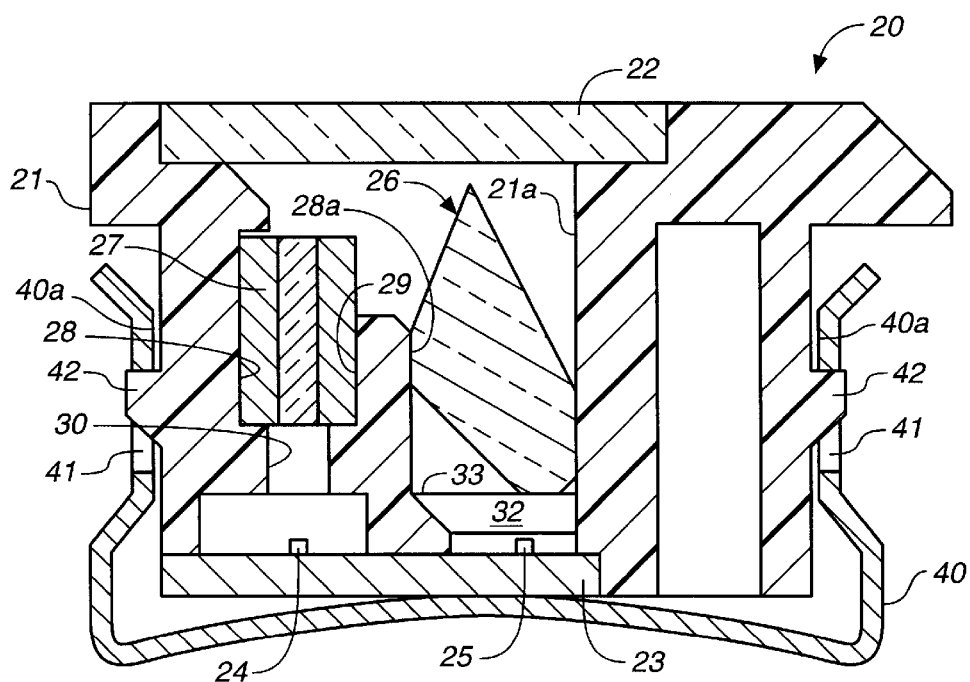
FIG._4

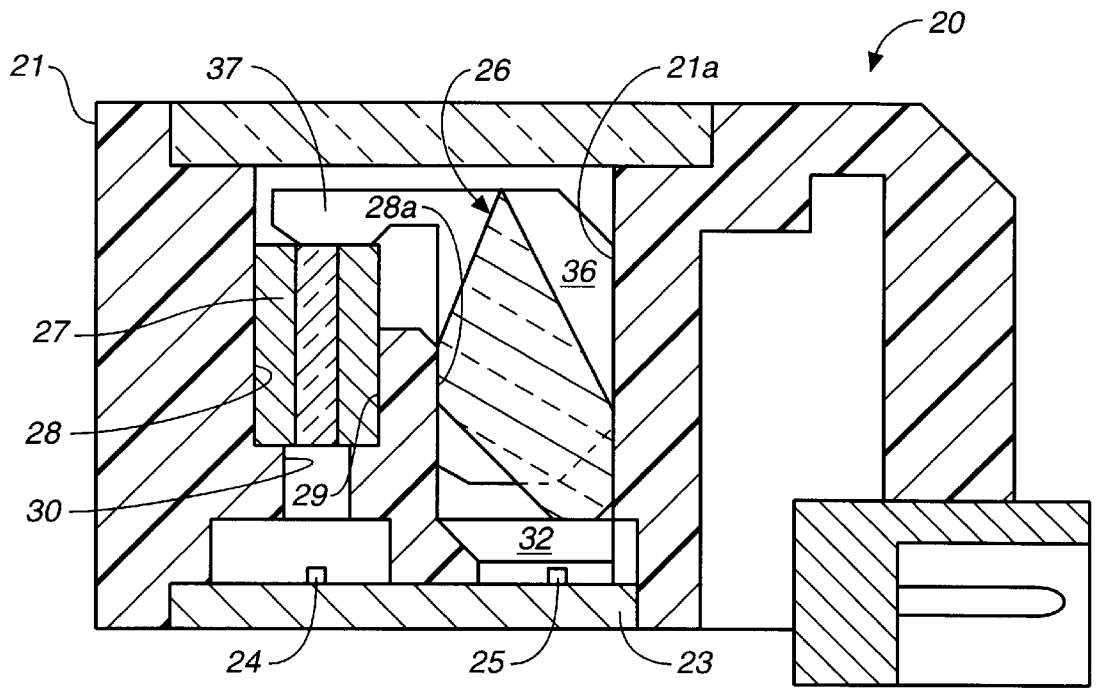
FIG._5
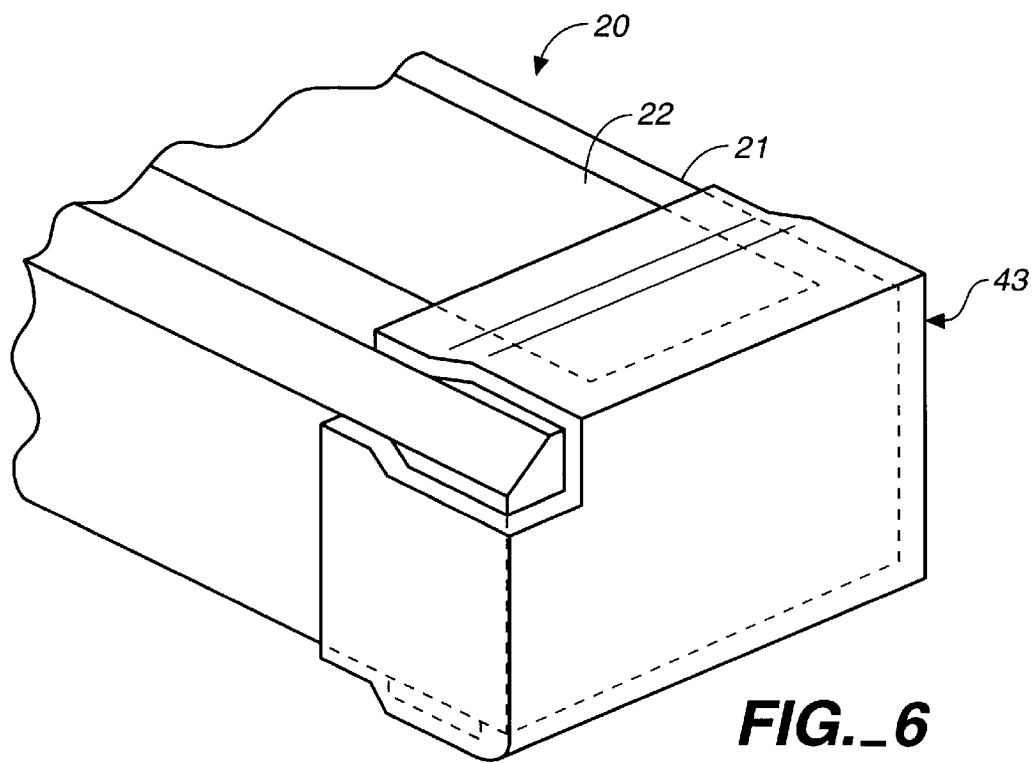
FIG._6

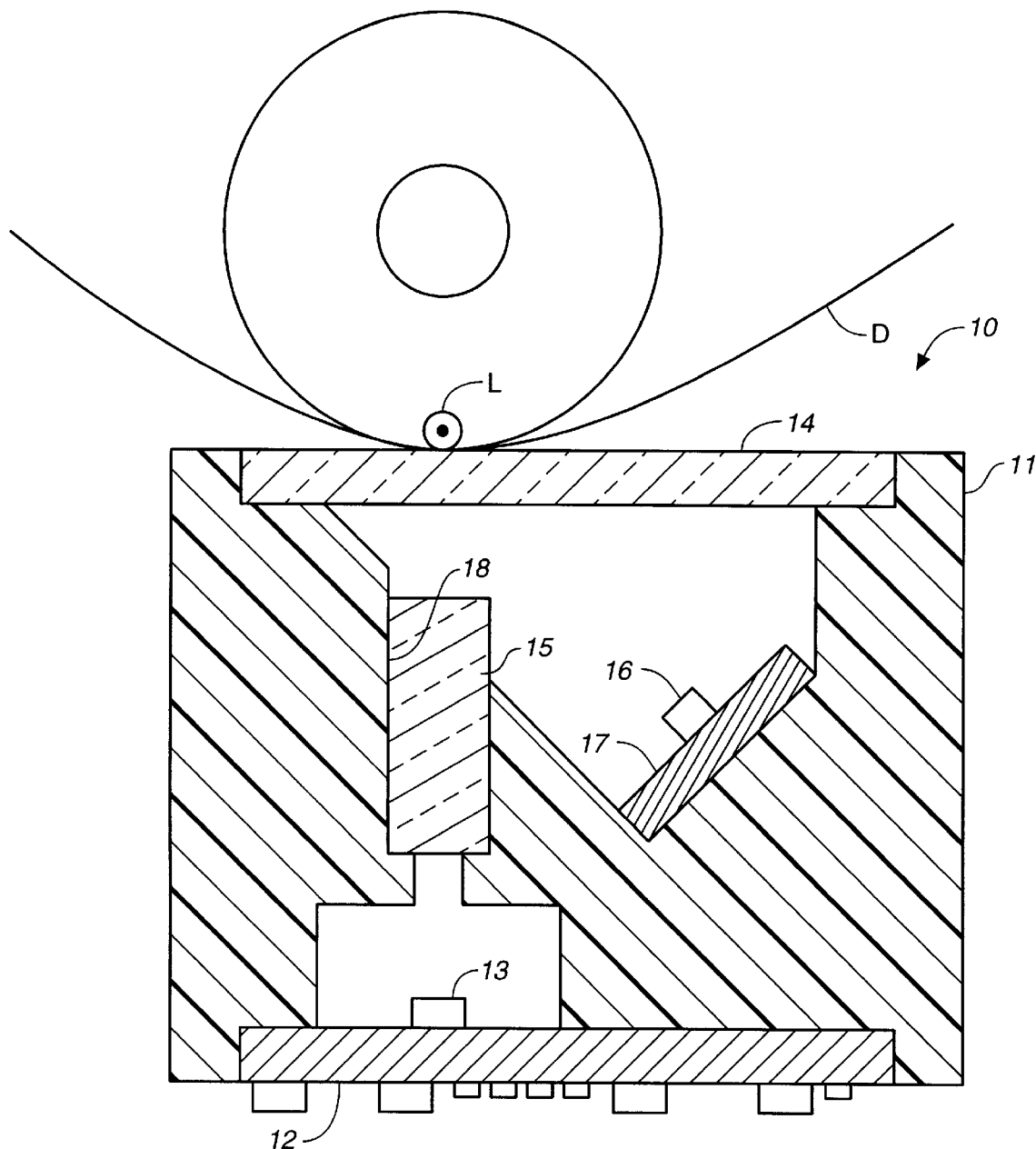
FIG._7
(PRIOR ART)

CONTACT-TYPE IMAGE SENSOR

BACKGROUND OF THE INVENTION

This invention relates to a contact-type image sensor for an image reading device such as a facsimile machine and an image scanner.

As shown in FIG. 7, a conventional contact-type image sensor 10 of this kind has a base plate 12 on the bottom surface of a case 11 which may be made of a resin material with a plurality of image sensor chips 13 attached to this base plate 12 over a distance which corresponds to the width of the image to be sensed. A transparent cover glass plate 14, with a read-off line L which is defined thereon perpendicular to the figure and hence is indicated thereon by a dot, is attached to the upper surface of the case 11, and a rod lens array 15 is disposed between this read-off line L and the image sensor chips 13 such that an erect (non-inverted) equally magnified image of a picture with different brightness along the read-off line L can be formed on the image sensor chips 13. The inner space of the case 11 also contains a plurality of light-emitting diodes 16 disposed on a supporting plate 17, serving as a light source for shining light on a document D from the back side of the glass plate 14. The rod lens array 15 is supported by engaging with a holder 18 with a groove set inside the case 11.

To assemble such an image sensor 10, the glass plate 14, the base plate 12 and the supporting plate 17 are affixed to the case 11 by means of an adhesive, and the rod lens array 15 is first engaged with the holder 18 but it is eventually fastened to it by means of an adhesive. Thus, the work of assembly involves many steps including application of an adhesive agent. This not only increases the cost of assembly but also adversely affects the efficiency of assembly work because it takes time for the adhesive to harden.

SUMMARY OF THE INVENTION

It is therefore an object of this invention to provide an improved contact-type image sensor which can be assembled easily in a reduced number of production steps.

An image sensor embodying this invention, with which the above and other objects can be accomplished, may be characterized as comprising not only a case, a glass cover attached to its upper surface, a head plate carrying a plurality of image sensor chips, a plurality of light-emitting elements for illuminating a document placed on the glass cover and a rod lens array for focusing the reflected light from the document on the image sensor chips, but also a light-conducting member which is placed inside the case for effectively directing the light from the light-emitting elements to a specified area of the glass cover, the upper surface of the rod lens array at both its ends being compressed by compressing members formed at both end parts of the light-conducting member.

According to a preferred embodiment of the invention, the rod lens array is inserted from above into a holder with a groove formed inside the case. With an image sensor thus structured, the rod lens array does not have to be fastened by means of any adhesive and still can be placed at a correct position inside the case. Since this dispenses with the step of applying an adhesive agent, the number of production steps is reduced, and the image sensor can be assembled more conveniently.

The aforementioned holder part may have protrusions formed for engaging with an edge of the upper surface of the rod lens array approximately in the middle in the longitudinal direction. With the holder part thus structured, the center portion of the rod lens array is compressed and held by these protrusions on the holder part and the both end parts are supported by the aforementioned compressing members such that the rod lens array can be stably supported at the specified position along its entire length even in the case of a contact-type image sensor with a relatively long read-off line.

It is further preferred to provide protrusions or indentations on the light-conducting member such that they can engage with indentations or protrusions correspondingly provided to the inner surface of the case. With such protrusions and matching indentations, not only the rod lens array, as described above, but also the light-conducting member can be secured inside the case without the use of an adhesive or such other means and hence the image sensor as a whole can be more easily assembled.

If the plurality of light-emitting elements for illuminating the document on the glass cover are mounted to the same plate which also supports the image sensor chips, the number of components to be assembled is reduced and this contributes to the reduction in the production cost of the image sensor.

It is also preferable to make use of a stopper device to fasten the head plate to the lower surface of the case such that no troublesome means such as an adhesive or screws need to be used for affixing the head plate to the case.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a diagonal exploded view of a contact-type image sensor embodying this invention;

FIG. 2 is a plan view of a portion of the image sensor of FIG. 1;

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 2;

FIG. 6 is a diagonal view of an alternative means for attaching the glass cover to the case; and FIG. 7 is a sectional view of a conventional contact-type image sensor.

DETAILED DESCRIPTION OF THE INVENTION

FIGS. 1–5 show a contact-type image sensor 20 according to a preferred embodiment of this invention. Its case 21 has an approximately rectangular cross-sectional shape with a specified longitudinal dimension and may be formed by a resin molding method. As can be seen in FIG. 3, for example, this case 21 has a vertically extending inner space, there being a glass cover 22 attached so as to close its upper opening and a head plate 23 attached so as to close its lower opening. A plurality of image sensor chips 24 are attached to the top surface of the head plate 23 on one side in the direction of its width, and a plurality of LED chips 25 serving as a light source for illumination are attached to the other side in the direction of the width. The inner space of the case 21 also contains a light-conducting member 26 made of a transparent resin material for effectively guiding the light from the LED chips 25 to illuminate a document D placed on the glass cover 22, as well as a rod lens array 27 for focusing reflected light from the surface of the document D on the image sensor chips 24 to form an erect (non-inverted) image with equal magnifications.

The rod lens array 27 is inserted from above into and held by a holder 28 with a groove formed inside the case 21. The holder 28 has an indented groove 29 shaped correspondingly to the planar shape of the rod lens array 27, having slits 30 provided at its bottom for allowing the light through the rod lens array 27 to pass therethrough and to reach the plurality of image sensor chips 24 disposed therebelow.

As shown in FIG. 3, there are two protrusions 31 at two positions on the inner wall of the holder 28 nearly in the middle in the longitudinal direction for engaging with one side edge on the upper surface of the rod lens array 27 so as to prevent the rod lens array 27 to float upward. These protrusions 31 have a suitable height so as not to prevent the rod lens array 27 from being inserted into the holder 28, and tapered surfaces 31a are formed on their upper sides.

The light-conducting member 26 is disposed sideways from the extension of the optical axis of the rod lens array 27 and serves to effectively direct the light emitted from the LED chips 25 attached to the head plate 23 onto or to a vicinity of the read-off line L (as defined above with reference to FIG. 7) by its prism effect. The light-conducting member 26 is inserted into a space surrounded by a base wall 33 having windows 32 which open correspondingly to the LED chips 25, one of the inner side walls 21a of the case 21 and an outer wall 28a of the groove-shaped holder 28.

As shown in FIG. 1, two protrusions 34 for engagement are formed on a side surface of the light-conducting member 26 near the middle in its longitudinal direction. Correspondingly, there are indentations 35 formed on the inner side wall 21a for engaging with the protrusions 34. As shown in FIGS. 1 and 5, furthermore, engaging blocks 36 with a specified vertical dimension are integrally formed so as to be engageable between the inner side wall 21a of the case 21 and the outer wall 28a of the holder 28. Compressing members 37 for compressing the upper surface of the rod lens array 27 at both its end positions are each integrally formed with and extending from respective one of these engaging blocks 36. A protrusion 38 and a rib 39 are each formed on the back surface of a respective one of the engaging blocks 36 such that these engaging blocks 36 can be engagingly held with a specified frictional force between the inner surface 21a of the case 21 and the outer wall 28a of the holder 28.

To assemble the image sensor 20 described above, the rod lens array 27 is first inserted from above into the groove of the holder 28 of the case 21. As this is done, the protrusions 31 formed on the inner wall of the holder 28 engage with an edge on the upper surface of the rod lens array 27, thereby preventing the rod lens array 27 to float upward.

Next, the light-conducting member 26 is inserted from above into the space surrounded by the inner wall 21a of the case 21 and the outer wall 28a of the holder 28. As the protrusions 34 on one of its side surfaces fit into the corresponding indentations 35 formed on the case 21, the engaging blocks 36 are tightly held at a designated position inside this inner space. The compressing members 37 protruding from the engaging blocks 36 compress the upper surface of the rod lens array 27 at both its end positions such that the rod lens array 27 is securely and dependably held at its designated position.

The glass cover 22 is inserted into the upper opening of the case 21 and may be fastened, say, by adhesion. The head plate 23 is inserted into the lower opening of the case 21 and fastened, say, by means of a fastening device 40 which, as shown in FIGS. 1 and 4, may comprise a plate spring member which is folded so as to be cross-sectionally shaped like letter M. Openings 41 provided in the leg parts 40a of this fastening device 40 are adapted to engage with protrusions 42 formed on both side surfaces of the case 21.

In summary, the rod lens array 27 and the light-conducting member 26 of the image sensor 20 according to this embodiment of the invention can be assembled without using any adhesive agent or a fastening device, but merely by pushing them into specified positions inside the case 21. Moreover, the plurality of LED chips 25 for illuminating the document D on the glass cover 22 are carried on the same head plate 23 provided for supporting the plurality of image sensor chips 24. In other words, there is no need to provide a separate base plate for supporting the LED chips 25. This contributes to reduce not only the production cost of the image sensor 20 but also the number of steps required in its assembly.

According to the embodiment of the invention described above, furthermore, the head plate 23 is fastened to the bottom surface of the case by means of a fastening device 40. Thus, it can be attached to the case 21 without any cumbersome means such as adhesives or screws.

Although the invention has been described above by way of only one example, this example is not intended to limit the scope of the invention. Many modifications and variations are possible within the scope of the invention. The glass cover 22 need not be fastened to the case 21 by means of an adhesive but may be attached as shown in FIG. 6 by using cap-shaped component 43 engaging both ends of the case 21. In summary, all such modifications and variations that may be apparent to a person skilled in the art are intended to be within the scope of this invention.

What is claimed is:

1. A contact-type image sensor comprising:
    a case;
    a glass cover attached to an upper surface of said case;
    a head plate supporting a plurality of image sensor chips;
    a plurality of light-emitting elements for illuminating a document placed on said glass cover;
    a rod lens array for focusing reflected light from a document placed on said glass cover at said image sensor chips;
    a light-conducting member placed inside said case for effectively directing light emitted from said light-emitting elements to a specified area on said glass cover; and
    compressing members which are provided at both end parts of said light-conducting members and serve to compress end parts of said rod lens array from above.

2. The image sensor of claim 1 wherein a holder with a groove is provided inside said case and said rod lens array is inserted in said holder from above.

3. The image sensor of claim 2 wherein said holder has protrusions which are engageable with an upper surface edge of said rod lens array at longitudinally middle positions.

4. The image sensor of claim 1 wherein said light-conducting member is attachable to an inner surface of said case by means of protrusions and matching indentations provided on said light-conducting member and said inner surface.

5. The image sensor of claim 2 wherein said light-conducting member is attachable to an inner surface of said case by means of protrusions and matching indentations provided on said light-conducting member and said inner surface.

6. The image sensor of claim 3 wherein said light-conducting member is attachable to an inner surface of said case by means of protrusions and matching indentations provided on said light-conducting member and said inner surface.

7. The image sensor of claim 1 wherein said light-emitting elements are supported by said head plate.

8. The image sensor of claim 2 wherein said light-emitting elements are supported by said head plate.

9. The image sensor of claim 3 wherein said light-emitting elements are supported by said head plate.

10. The image sensor of claim 4 wherein said light-emitting elements are supported by said head plate.

11. The image sensor of claim 5 wherein said light-emitting elements are supported by said head plate.

12. The image sensor of claim 6 wherein said light-emitting elements are supported by said head plate.

13. The image sensor of claim 1 further comprising stopper devices for fastening said head plate on a lower surface of said case.

14. The image sensor of claim 2 further comprising stopper devices for fastening said head plate on a lower surface of said case.

15. The image sensor of claim 3 further comprising stopper devices for fastening said head plate on a lower surface of said case.

16. The image sensor of claim 4 further comprising stopper devices for fastening said head plate on a lower surface of said case.

17. The image sensor of claim 5 further comprising stopper devices for fastening said head plate on a lower surface of said case.

18. The image sensor of claim 6 further comprising stopper devices for fastening said head plate on a lower surface of said case.

19. The image sensor of claim 7 further comprising stopper devices for fastening said head plate on a lower surface of said case.

20. The image sensor of claim 8 further comprising stopper devices for fastening said head plate on a lower surface of said case.

21. The image sensor of claim 9 further comprising stopper devices for fastening said head plate on a lower surface of said case.

22. The image sensor of claim 10 further comprising stopper devices for fastening said head plate on a lower surface of said case.

23. The image sensor of claim 11 further comprising stopper devices for fastening said head plate on a lower surface of said case.

24. The image sensor of claim 12 further comprising stopper devices for fastening said head plate on a lower surface of said case.

* * * * *